United States Patent [19]

Kutschera et al.

[11] Patent Number: 4,835,516
[45] Date of Patent: May 30, 1989

[54] ARRANGEMENT FOR INTRODUCING AUDIO-FREQUENCY SIGNALS INTO A POWER SUPPLY LINE

[75] Inventors: Karlheinz Kutschera, Brauningshof; Rudolf Seibert; Walther Scharm, both of Nürnberg; Manfred Schwendtner, Schwarzenbruck, all of Fed. Rep. of Germany

[73] Assignee: Siemens Aktiengesellschaft, Munich, Fed. Rep. of Germany

[21] Appl. No.: 21,620

[22] Filed: Mar. 2, 1987

Related U.S. Application Data

[63] Continuation of Ser. No. 573,556, Jan. 25, 1984, abandoned.

[30] Foreign Application Priority Data

Feb. 8, 1983 [DE] Fed. Rep. of Germany ....... 3304243

[51] Int. Cl.$^4$ .............................................. H04B 3/54
[52] U.S. Cl. ............................ 340/310 R; 340/310 A; 375/37
[58] Field of Search ........ 340/310 R, 310 A, 310 CP, 340/288; 307/3, 149; 323/356; 333/24 C; 375/37

[56] References Cited

U.S. PATENT DOCUMENTS

| | | | |
|---|---|---|---|
| 1,539,902 | 6/1925 | Honaman . | |
| 4,057,793 | 11/1977 | Johnson et al. | 340/310 R |
| 4,065,763 | 12/1977 | Whyte et al. | 340/310 R |
| 4,254,402 | 3/1981 | Perkins | 340/310 R |
| 4,321,581 | 3/1982 | Tappeiner et al. | 340/310 R |
| 4,383,243 | 5/1983 | Krügel et al. | 340/310 R |
| 4,433,284 | 2/1984 | Perkins | 340/310 R |
| 4,473,816 | 9/1984 | Perkins | 340/310 R |

OTHER PUBLICATIONS

Bulletin SEV (Swiss Electrotechnical Association), vol. 49, 1958; FIG. 2, p. 1026; FIG. 3 and p. 1028, FIG. 6.
Siemens Zeitschrift, Band 48, vol. 2, 1974, pp. 69–75.
Bull. SEV (Swiss Electrotechnical Association), vol. 52, No. 11, pp. 436–440, Jun. 1961.

Primary Examiner—Joseph A. Orsino
Assistant Examiner—Brent A. Swarthout
Attorney, Agent, or Firm—Scully, Scott, Murphy & Presser

[57] ABSTRACT

An arrangement for introducing audio-frequency signals into a power supply line containing a compensating capacitor, through a junction converter having primary winding which is connected with an audio-frequency signal generator. The secondary winding of the junction converter is connected in series with the compensating capacitors which are not located in a parallel branch line to the secondary winding of the junction converter, and thus do not represent a load on the audio-frequency signal. The audio-frequency signal is coupled into the power supply line through the compensating capacitors which are connected in series with the secondary winding, whereby the coupling in is effected, on the one hand, through one and, on the other hand, through two parallel-connected compensating capacitors.

6 Claims, 1 Drawing Sheet

ARRANGEMENT FOR INTRODUCING AUDIO-FREQUENCY SIGNALS INTO A POWER SUPPLY LINE

This application is a continuation, of application Ser. No. 573,556, filed Jan. 25, 1984 now abandoned.

BACKGROUND OF THE INVENTION

1. Field of the Invention

The present invention relates to an arrangement for introducing audio-frequency signals into a power supply line containing a compensating capacitor, through a junction converter having a primary winding which is connected with an audio-frequency signal generator.

2. Discussion of the Prior Art

In the power supply lines there is frequently effected a command or information transmission with the assistance of signals which are superimposed on the supply voltage. The frequency of these signals usually lies within the audiofrequency range of between 150 Hz and 20 kHz and, consequently, they are also designated as audio-frequency signals. The introduction of these audio-frequency signals is usually effected through a junction converter whose primary winding is connected with an audio-frequency signal generator and whose secondary winding is connected between two phases. However, hereby it must be noted that the capacitors which are occasionally present in the power supply will impart a load on the audio-frequency signal. For example, median-voltage supply lines are frequency compensated by means of star-connected compensating capacitors. These compensating capacitors evidence a relatively high capacitance. These compensating condensers represent an impedance to the audio-frequency signals, which is lower at the higher frequencies and vise versa of the audiofrequency signals. The compensating capacitors thereby represent a high loading on the audio-frequency generator which, above all, corresponds to a short-circuit in the upper frequency range of the audio frequency signals. At higher frequencies, for the introduction of the audio-frequency signals without the application of additional measures, there is required an uneconomically high level of transmitting power. Moreover, the audio-frequency signals represent an additional load on the compensating capacitors. In current installations, an inductive impedance is connected ahead of each capacitor. As a result thereof, there is increased the impedance which is effective for the audifrequency signals; in essence, there is reduced the load on the audio-frequency signal generator. Since impedances of that type must be designed for the full current which flows through the capacitor, they become quite large and are installed with difficulty.

SUMMARY OF THE INVENTION

Accordingly, it is an object of the present invention to so construct an arrangement for the introduction of audio frequency signals of the above-mentioned type, wherein the compensating capacitors will not impart a load on the audio-frequency signal generator even without impedances being connected ahead thereof.

The foregoing object is inventively achieved in that the secondary winding of the junction converter is connected in series with a compensating capacitor. Achieved thereby is that the compensating capacitors are not located in a parallel branch line to the secondary winding of the junction converter and thus do not represent a load on the audio-frequency signals. The audio-frequency signal is coupled into the power supply line through the compensating capacitors which are connected in series with the secondary winding, whereby the coupling in is effected, on the one hand, through one and, on the other hand, through two parallel-connected compensating capacitors. The compensating capacitors also will not prevent the propagation of the audio frequency signals, but will even assist therein. Impedances which are connected ahead thereof are not required, and the arrangement is simple in its installation.

In an arrangement wherein the compensating capacitors are joined together through a starpoint connection, there can be introduced the secondary winding of the junction converter into the line interconnecting the two compensating capacitors.

Suitably, the junction converter exhibits a high resistance in the magnetic circuit. Inasmuch as, in this manner, there is prevented any saturation of the junction converter, even in the absence of a high-ohmic resistor, low-ohmic termination of the primary winding of the junction converter is necessary for the power supply line. The high resistance in the magnetic circuit is achieved in the simplest manner in that the core of the junction converter provides for an air gap.

Alternatively, the secondary winding of the junction converter can be connected in parallel with a parallel-oscillator circuit which is correlated with the audio-frequency. This oscillator-circuit coil represents a low impedance for the power supply frequency so that the junction converter for the power supply frequency is bridged in a low-ohmic mode. Avoided thereby is any saturation of the junction converter due to the supply-frequencied current. For the audio-frequency, the resistance of the paralleloscillator circuit is high so as not to impose practically any load on the audio-frequency generator.

When additional compensating capacitors are present in the power supply line, then advantageously connected in the phase of the power supply line in which there is located the secondary winding of the junction converter, is a parallel-oscillator circuit which is correlated with the audio-frequency and which is connected in series with the additional compensating capacitor. This will prevent any short-circuiting of the audio-frequency signals by means of the additional compensating capacitors. It is adequate to provide the parallel-oscillator circuit in one phase inasmuch as the two other phases serve as a common return conductor for the audio-frequency signal.

BRIEF DESCRIPTION OF THE DRAWINGS

Reference may now be had to the following detailed description of an exemplary embodiment of the invention, taken in conjunction with the accompanying drawings; in which.

DETAILED DESCRIPTION

Figure 1:
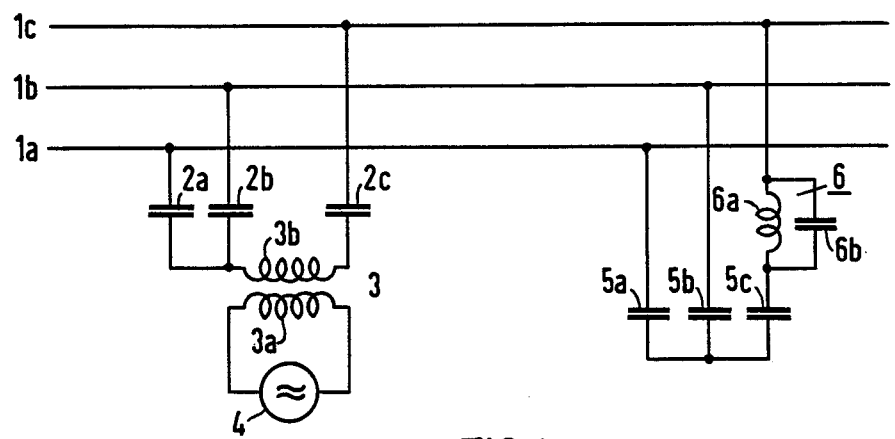
FIG. 1 illustrates a power supply network incorporating three phase conductors.

FIG. 1 illustrates an electrical power supply line with three phase conductors $1a$, $1b$, and $1c$. This power supply line which, for example, can be a median-voltage supply line, includes at its central location a reactive current compensating device with three compensating capacitors 2a, 2b and 2c. Thereby, the first connectors or terminals of the compensating capacitors 2a through 2c are each, respectively, connected with a phase conductor 1a through 1c. The respective second connectors or terminals of the compensating capacitors 2a and 2b are connected with each other and, in addition thereto, are connected through the secondary winding 3b of the junction converter 3 with the second connector of the compensating capacitor 2c. Connected to the primary winding 3a of the junction converter 3 is an audio-frequency signal generator.

The compensating capacitors 2a through 2c are thus in a star-connection, whereby the low stray or parasitic inductance of the secondary winding 3b has practically no effect over the problem of the reactive current compensation. The signal which is delivered by the audio-frequency signal generator 4 is coupled through the junction converter 3 and the compensating capacitor 2c into the phase conductor 1c, through the condensating capacitor 2b into the phase conductor 1b, and through the compensating capacitor 2a into the phase conductor 1a. Hereby, the compensating capacitors 2a through 2c do not act as they would in the usual arrangements as a short-circuit for the audio frequency signals, since they are connected in series and not in parallel with the primary winding 3b. The audio-frequency signal is thus not weakened through the compensating capacitors 2a through 2c, independent of their impedance. In this instance, the compensating capacitors 2a through 2c even effect the coupling in of the audio-frequency signal into the individual phase conductors 1a through 1c. The compensating condensors 2a through 2c need not have any inductive impedance connected ahead thereof. The illustrated arrangement can be readily installed in a power supply station which contains the compensating capacitors 2a through 2c. In the embodiment according to FIG. 1, the median-voltage supply line contains further compensating capacitors 5a through 5c which are also joined in a star-connection. In order to prevent these from short-circuiting or loading the audio-frequency signal, connected in series with the compensating capacitor 5c is a parallel-oscillator circuit 6 which is correlated with the audio-frequency which is also referred to in the art as a parallel resonant circuit. This parallel-oscillator circuit 6 must be arranged in only one phase 1c of the alternating current supply; namely, in the same phase in which there is also located the secondary winding 3b of the junction converter 3. For the two other phases 1a and 1b which serve as a common return line, an audio-frequency block is not necessary.

In the embodiment according to FIG. 1, the core or armature of the junction converter 3 must exhibit a high magnetic resistance which can be achieved, for example, by means of an air gap. Prevented thereby is that the 50 Hz current flowing through the compensating capacitors 2a through 2c will lead to a saturation of the converter 3.

Figure 2:
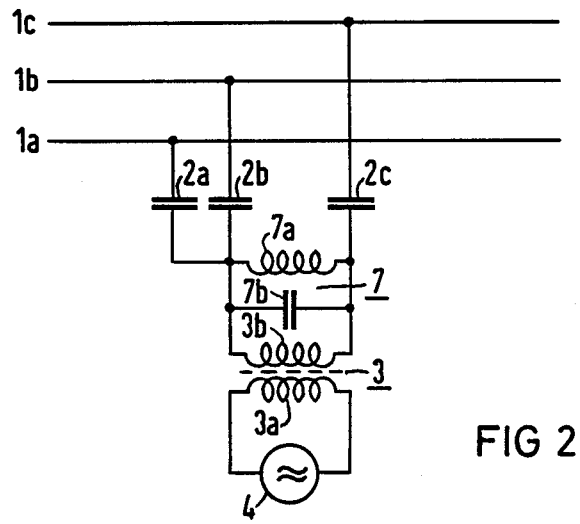
FIG. 2 is an arrangement similar to that of FIG. 1 and wherein the secondary winding of a current converter consists of an oscillator circuit coil and a capacitor.

Alternatively, in accordance with the embodiment pursuant to FIG. 2, the secondary winding 3b can have connected in parallel therewith a parallel-oscillator circuit 7 (also known as a parallel resonant circuit) correlated with the audio-frequency, which consists of an oscillator circuit coil 7a and a capacitor 7b. The oscillator circuit coil 7a represents a low-ohmic shunt for the junction converter 3 for currents at power supply frequency. Prevented thereby is any saturation of the junction converter 3 even without a high magnetic resistance, so that the junction converter 3 can be constructed more compactly. For the audio-frequency the parallel-oscillator circuit 7 is high-ohmic so as to practically exert no load on the audio-frequency signal.

What is claimed is:

1. In an arrangement for introducing audio-frequency signals into a power supply line, having multiple phase conductors, containing compensating capacitors for the multiple phase conductors, provided for compensating for an inductive load within the power supply line, which compensating capacitors are interconnected in a star connection wherein one side of each capacitor is coupled to one of the multiple phase conductors and the other side of each capacitor is coupled to a common star connection, and wherein the audio-frequency signals are introduced through a junction converter having a single primary winding connected with an audio-frequency signal generator; the improvement comprising in that said junction converter includes a secondary winding; and said secondary winding is connected in said star connection in series with one of said compensating capacitors for one phase conductor between the common star connection and the one phase conductor, while each of the other compensating capacitors is connected directly to the common star connection between the common star connection and the multiple phase conductor to which it is coupled, such that the series connected compensating capacitor does not effectively short circuit the higher frequency audio-frequency signals being introduced into the power supply line. and said capacitors do not substantially attenuate the propagation of the audio frequency signals 2. Arrangement as claimed in claim 1, wherein said compensating capacitors are interconnected by conductors in a star-connection, and one said conductor interconnecting said compensating capacitors is coupled into the secondary winding of said junction converter.

3. Arrangement as claimed in claim 1, wherein said junction converter exhibits a high resistance in the magnetic circuit presented by said primary winding and said secondary winding.

4. Arrangement as claimed in claim 3, wherein said junction converter has an air gap formed in its armature.

5. Arrangement as claimed in claim 1, comprising a parallel resonant circuit which is correlated with the audio-frequency being connected in parallel with the secondary winding of the junction converter.

6. Arrangement as claimed in claim 1, comprising additional compensating capacitors in the power supply line; and a parallel resonant circuit which is correlated with the audio-frequency being connected in series with said additional compensating capacitors in the phase of the power supply line which contains the secondary winding of the junction converter.

* * * * *

UNITED STATES PATENT AND TRADEMARK OFFICE
CERTIFICATE OF CORRECTION

PATENT NO. : 4,835,516

DATED : May 30, 1989

INVENTOR(S) : Karlheinz Kutschera, et al.

It is certified that error appears in the above-identified patent and that said Letters Patent is hereby corrected as shown below:

Column 4, lines 39-43, Claim 2: "Arrangement as claimed in claim 1, wherein said compensating capacitors are interconnected by conductors in a star-connection, and one said conductor interconnecting said compensating capacitors is coupled into the secondary winding of said junction converter." should read as --Arrangement as claimed in claim 1, said compensating capacitors being joined in a star-connection, and the conductor interconnecting said compensating capacitors being coupled into the secondary winding of said junction converter.--

Signed and Sealed this

Twenty-second Day of May, 1990

Attest:

HARRY F. MANBECK, JR.

*Attesting Officer*     *Commissioner of Patents and Trademarks*